United States Patent [19]
Yokoyama et al.

[11] Patent Number: 5,261,322
[45] Date of Patent: Nov. 16, 1993

[54] FRYER APPARATUS IN COMMERCIAL APPLICATION

[75] Inventors: Nobuyoshi Yokoyama; Susumu Eijiri, both of Toyoake, Japan

[73] Assignee: Paloma Kogyo Kabushiki Kaisha, Nagoya, Japan

[21] Appl. No.: 15,372

[22] Filed: Feb. 9, 1993

[30] Foreign Application Priority Data

Feb. 14, 1992 [JP] Japan ................... 4-061310

[51] Int. Cl.$^5$ ................ A47J 27/00; F23C 11/04
[52] U.S. Cl. ................... 99/330; 99/331; 99/403; 99/408; 126/343.5 A; 126/360 R; 126/391; 431/1; 210/167; 210/DIG. 8
[58] Field of Search ............ 99/326, 330, 331, 334, 99/403, 407, 408, 409, 357; 126/390, 391, 343.5 A, 360 R; 431/1; 122/24; 210/167, DIG. 8

[56] References Cited
U.S. PATENT DOCUMENTS

| | | | |
|---|---|---|---|
| 4,550,711 | 11/1985 | Griffiths | 126/391 |
| 4,569,277 | 2/1986 | Stiglich | 99/330 |
| 4,569,310 | 2/1986 | Davis | 122/24 |
| 4,623,544 | 11/1986 | Highnote | 99/331 |
| 4,628,903 | 12/1986 | Farnsworth et al. | 431/1 |
| 4,928,664 | 5/1990 | Nishino et al. | 126/391 |
| 4,946,604 | 12/1990 | Nishino | 431/1 |
| 4,947,824 | 8/1990 | Ejiri et al. | 99/403 |
| 4,949,703 | 8/1990 | Ejiri et al. | 126/360 R |
| 5,038,753 | 8/1991 | Yokoyama et al. | 99/403 |
| 5,050,582 | 9/1991 | Almond et al. | 99/403 |

*Primary Examiner*—Timothy F. Simone
*Attorney, Agent, or Firm*—Lahive & Cockfield

[57] ABSTRACT

The present invention provides an improved fryer apparatus including a small size pulse combustor and an additional labor-saved function such as a filtering system or a lift system. The pulse combustor of the invention does not include a check valve or flapper valve for preventing back flow of combustion exhaust in an air supply system. This valve-free structure of the pulse combustor allows sufficient noise reduction without any silence or muffler and makes a free space for the filtering system or the lift system.

11 Claims, 4 Drawing Sheets

FRYER APPARATUS IN COMMERCIAL APPLICATION

BACKGROUND OF THE INVENTION

1. Field of the Invention

The present invention relates to a fryer apparatus in commercial application, which includes a pulse combustor as a heat source.

2. Description of the Related Art

Fryer or deep fat frying apparatus including a pulse combustor as a heat source have widely been used in commercial cooking of food items such a french fries and breaded chicken. The pulse combustor repeats explosion and combustion at a certain cycle so as to heat cooking oil contained in a frypot with heat transmitted through a combustion chamber and a tail pipe wall. FIG. 4 is a schematic view showing a conventional fryer apparatus 100 with a pulse combustor.

The conventional fryer apparatus 100 includes: a frypot 10 which is filled with cooking liquid or oil for deep fat frying frozen food items; and a pulse combustor 11 for heating the cooking oil contained in the frypot 10. The pulse combustor 11 has a combustion-exhaust system, an air supply system, a fuel gas supply system, and an electric installation system 27 for controlling pulse combustion.

The combustion-exhaust system includes: a combustion chamber 12 disposed in the frypot 10 for pulse combustion; tail pipes 13 constituting an exhaust conduit of hot combustion byproducts from the combustion chamber 12; an exhaust decoupler 14 connecting to the tail pipes 13; and two exhaust mufflers 15, 15' coupled with the exhaust decoupler 14.

The air supply system for supplying air to the combustion chamber 12 includes: a fan 16 feeding the air for combustion; an intake muffler 17 connecting to the fan 16 in the air flow path; and an air chamber 18 coupled to the combustion chamber 12 for receiving the air fed through the intake muffler 17.

The fuel gas supply system includes: two electromagnetic valves 20, 21 for opening and closing a flow path of fuel gas supplied through a gas conduit 19; a gas governor 22 for adjusting the gas pressure; and a gas chamber 23 disposed in the air chamber 18. Elements in the air chamber 18 are drawn by the thin lines for clarification.

The fuel gas supplied into the gas chamber 23 and the air supplied into the air chamber 18 are mixed with each other in a mixing chamber 24 arranged in the intake side of the combustion chamber 12. A mixture of the air and the fuel gas is then fed into the combustion chamber 12 at which the mixture is ignited and explosively combusted. The negative pressure generated immediately after the explosion allows further admission of the fuel gas and the air for the subsequent combustion. Heat generated in such a cyclic explosion and combustion is applied through the walls of the combustion chamber 12 and the tail pipes 13 to heat cooking oil in the frypot 10.

The pulse combustor 11 is further provided with a gas flapper valve 25 and an air flapper valve 26 respectively mounted at the inlets of the fuel gas and the air into the mixing chamber 24 to prevent back flow of combustion exhaust into the gas supply system or the fuel gas supply system due to explosive combustion. These flapper valves 25, 26 close in response to the combustion pressure for preventing the back flow and open in response to the negative pressure generated immediately after the explosive combustion to feed the gas and the air to the mixing chamber 24.

In the pulse combustor 11 thus constructed, there is undesirably large noise due to opening and closing of the gas flapper valve 25 and the air flapper valve 26, along with combustion noise due to high combustion pressure. The conventional fryer apparatus 100 includes silencers for noise reduction, that is, the intake muffler 17 and the exhaust mufflers, 15, 15', which occupy relative large spaces and thereby make the fryer apparatus 100 itself undesirably large.

In the commercial cooking application, this bulky fryer apparatus makes it difficult to add some convenient man-saved functions such as a lift system for elevating and soaking food items from and into the frypot or a filtering system for cleansing used cooking oil by filtering particulate food matter from the oil drained from the frypot.

SUMMARY OF THE INVENTION

An object of the invention is accordingly to provide an improved fryer apparatus in commercial application, which includes a smaller-sized pulse combustor as a heat source.

Another object of the invention is to allow the fryer apparatus to include a man-saved system such as a lift system or a filtering system.

The above and other related objects are realized by a fryer apparatus in commercial application, wherein cooking oil in frypot is heated by means of a pulse combustor, which includes: a combustion chamber for receiving mixture of air and fuel gas for pulsative combustion of the mixture; a mixing chamber being coupled with and connected to the combustion chamber for mixing air and fuel gas and supplying the air/fuel mixture to the combustion chamber; an air supply system for supplying the air to the mixing chamber; and a fuel gas supply system for supplying fuel gas to the mixing chamber.

The improvement of the invention is characterized by that the air supply system of the pulse combustor does not have a check valve for preventing back flow of combustion exhaust into the air supply system. The air supply system instead has an ever-on fan for continuously feeding the air to the mixing chamber and for diluting combustion exhaust back flown to the mixing chamber with air/fuel mixture and supplying the exhaust-containing air/fuel mixture to the combustion chamber. The fuel gas supply system may also be free of a check valve for preventing back flow of combustion exhaust into the fuel gas supply system.

Since the pulse combustor in the fryer apparatus of the invention does not include a check valve in the air supply system, there is no opening or closing noise. The lower combustion pressure of such pulse combustor further reduces the combustion noise. These noise elimination or reduction allow silencers or mufflers to be removed from or at least down-sized in the pulse combustor, thereby making the fryer apparatus itself favorably small and compact.

The reduction or down-sizing of silencers or mufflers allows a certain free space in the fryer apparatus, which may thus include a filtering system for cleansing used cooking oil by filtering particulate food matter from the oil drained from the frypot or a lift system for elevating and soaking food items from and into the frypot.

DESCRIPTION OF THE PREFERRED EMBODIMENT

Figure 1:
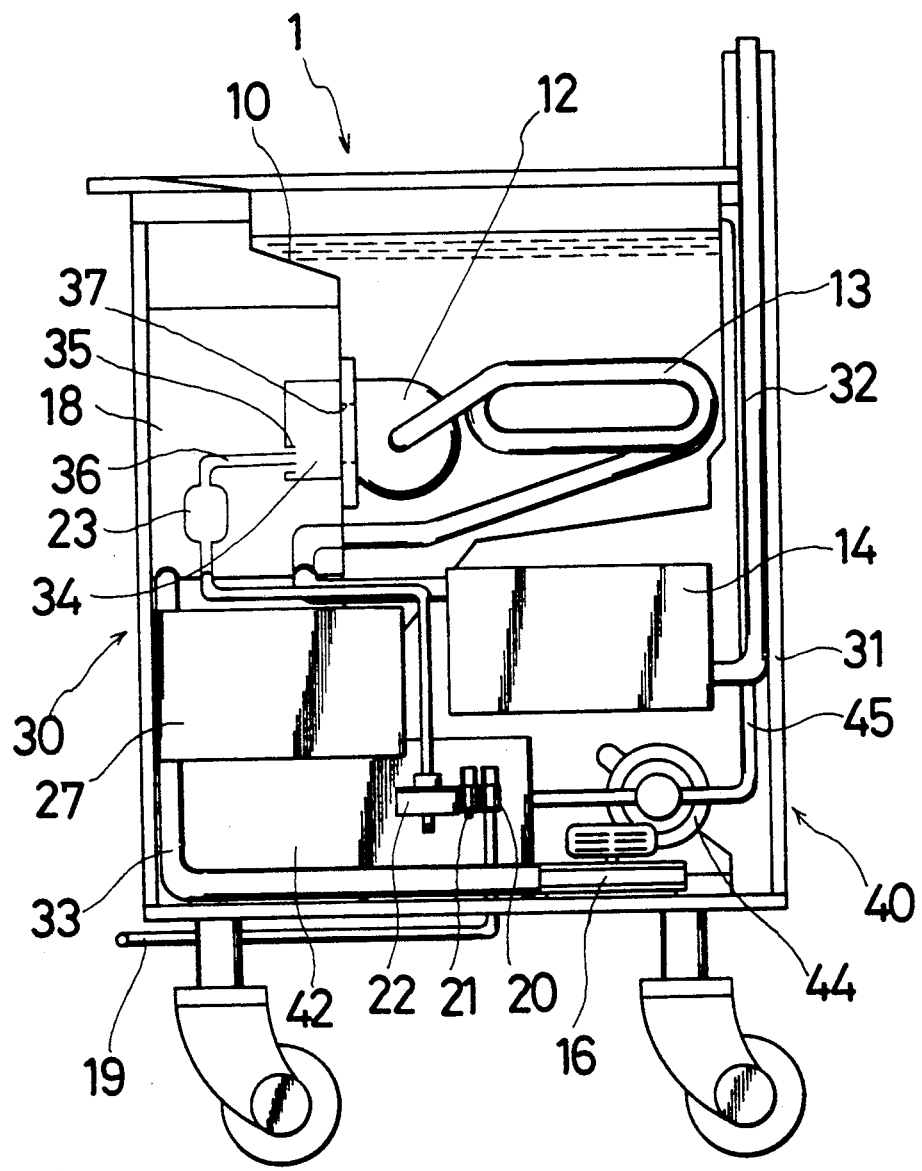
FIG. 1 is a schematic view showing a fryer apparatus in commercial application as a first embodiment of the invention.
Figure 4:
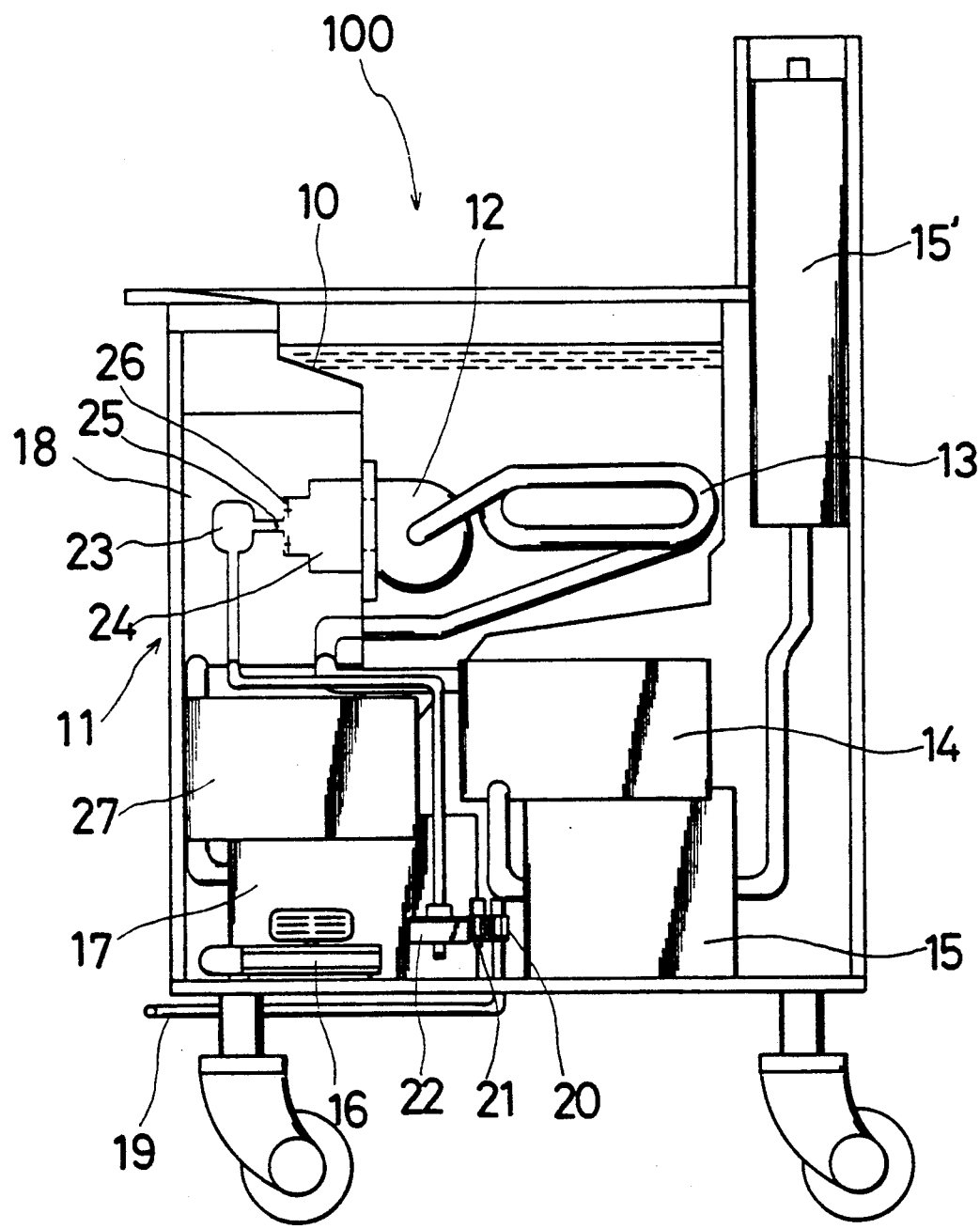
FIG. 4 is a schematic view showing a conventional fryer apparatus in commercial application.

FIG. 1 is a side view (side-panel omitted) schematically showing a fryer apparatus in commercial application as a first embodiment of the invention. In the description below, the same elements as those in the prior art fryer apparatus explained according to FIG. 4 have the same numerals.

A fryer apparatus 1 in commercial application includes: a frypot 10 which is filled with cooking oil; a pulse combustor 30 for heating cooking oil in the frypot 10; a filtering system 40 for cleansing used cooking oil by filtering particulate food matter from the oil drained from the frypot 10; and a casing 31. The pulse combustor 30 has a combustion-exhaust system, an air supply system, and a fuel gas supply system.

The combustion-exhaust system includes: a combustion chamber 12 disposed in the frypot 10 for pulse combustion; tail pipes 13 constituting an exhaust conduit of hot combustion byproducts from the combustion chamber 12; an exhaust decoupler 14 connecting to the tail pipes 13; and an exhaust conduit 32 coupled with the exhaust decoupler 14. The fryer apparatus 1 of the first embodiment does not have exhaust mufflers 15, 15' which the conventional fryer apparatus 100 includes, as mentioned above.

The air supply system for supplying air to the combustion chamber 12 includes: a fan 16 feeding the air for combustion via an admission opening (not shown) formed in the bottom of the housing 31; an intake conduit 33 through which the air fed by the fan 16 flows; and an air chamber 18 coupled to the combustion chamber 12 for receiving the air fed through the intake conduit 33. The fryer apparatus 1 of the first embodiment does not have an intake muffler 17 which the conventional fryer apparatus 100 includes, as mentioned above.

The fuel gas supply system includes: a gas conduit 19 arranged in the lower portion of the housing 31; two electromagnetic valves 20, 21 for opening and closing a flow path of fuel gas supplied through the gas conduit 19; a gas governor 22 for adjusting the gas pressure; and a gas chamber 23 disposed in the air chamber 18.

Elements in the air chamber 18 are drawn by the thin lines for clarification. In the air chamber 18, there is, along with the gas chamber 23, a cylindrical mixing chamber 34 connected to and coupled with the combustion chamber 12. The mixing chamber 34 has a tubular second opening 35 formed at a position apart from the axial center of the chamber 34. An L-shaped gas supply conduit 36 for supplying fuel gas goes through the air chamber 18 and has one end projecting into the mixing chamber 34 via the second opening 35. Fuel gas is thus supplied into the mixing chamber 34 via the gas chamber 23 and the second opening 35, while the air is supplied into the mixing chamber 34 via the air chamber 18 and the second opening 35.

The mixing chamber 34 and the combustion chamber 12 are connected to each other via a first opening 37. A flame trap (not shown) is fitted into the first opening 37 to prevent back fire from the combustion chamber 12 to the mixing chamber 34. An ignition plug (not shown) for igniting mixture of air and fuel gas and a flame rod (not shown) for detecting the flame are further mounted on the wall of the combustion chamber 12.

The pulse combustor 30 of the first embodiment does not include any check valve or flapper valve, unlike the conventional pulse combustor 11. Hot, high-pressure combustion exhaust is thus partly flown back to the mixing chamber 34, while being mostly discharged through the tail pipes 13 by the explosion pressure. The ever-on fan 16 continuously feeds the air to dilute the back flown combustion exhaust with air/fuel mixture and supply the exhaust-containing air/fuel mixture to the combustion chamber 12. Adverse effects of the back pressure due to the explosive combustion are sufficiently reduced by the air chamber 18, the gas chamber 23, the eccentric structure of the second opening 35 of the mixing chamber 34 with respect to the first opening 37, and the L-shaped structure of the gas supply conduit 36.

The pulse combustor 30 of the first embodiment accordingly attains favorable pulse combustion without a flapper valve or check valve for preventing the back flow, thus being free from undesirable opening or closing noise of the valve. The lower combustion pressure also reduces the combustion noise. The pulse combustor 30 thereby does not require any silencer such as an inlet muffler or an exhaust muffler which has conventionally been required.

The fryer apparatus 1 includes the filtering system 40 in a free space made by this check valve-free structure of the pulse combustor 30.

Figure 2:
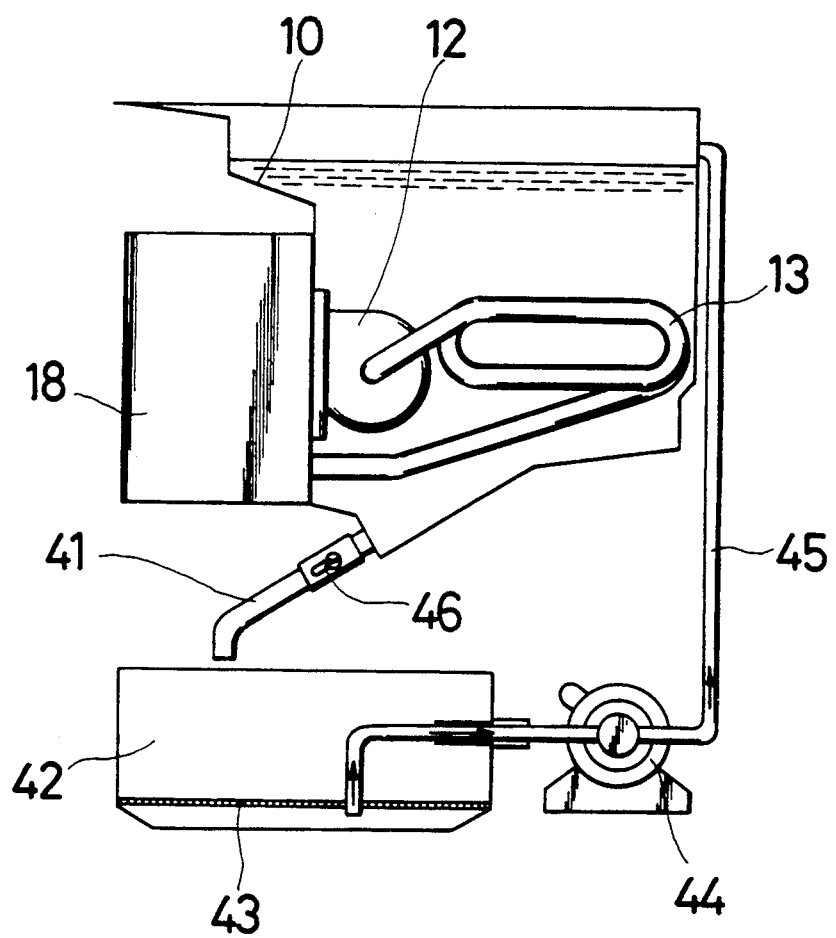
FIG. 2 is a schematic view showing structure of a filtering system for cleansing used cooking oil, incorporated in the fryer apparatus of FIG. 1.

As shown in FIG. 2, the filtering system 40 includes: an oil reservoir 42 disposed under a draining conduit 41 connected to the bottom of the frypot 10; a filter element 43 arranged in the lower portion of the oil reservoir 43; an oil pump 44 for returning cooking oil, cleansed through the filter element 43, to the frypot 10; and a piping system 45 constituting a return path of the cleansed cooking oil. Cooking oil drained from the frypot 10 via a draining valve 46 disposed in the draining conduit 41 is received in the oil reservoir 42, cleansed through the filter element 43, and returned to the frypot 10 by the oil pump 44.

As described above, the fryer apparatus 1 of the first embodiment includes the check valve-free pulse combustor 30 as a heat source, which sufficiently reduces undesirable noise without any inlet or exhaust muffler. This valve-free structure allows the filtering system 40 to be installed in the fryer apparatus 1 without making the fryer apparatus unfavorably bulky, thus desirably saving both the space and labor in commercial cooking facilities.

Although the pulse combustor of the embodiment does not include any muffler, one or plural small size mufflers may be included to attain the similar effects.

Figure 3:
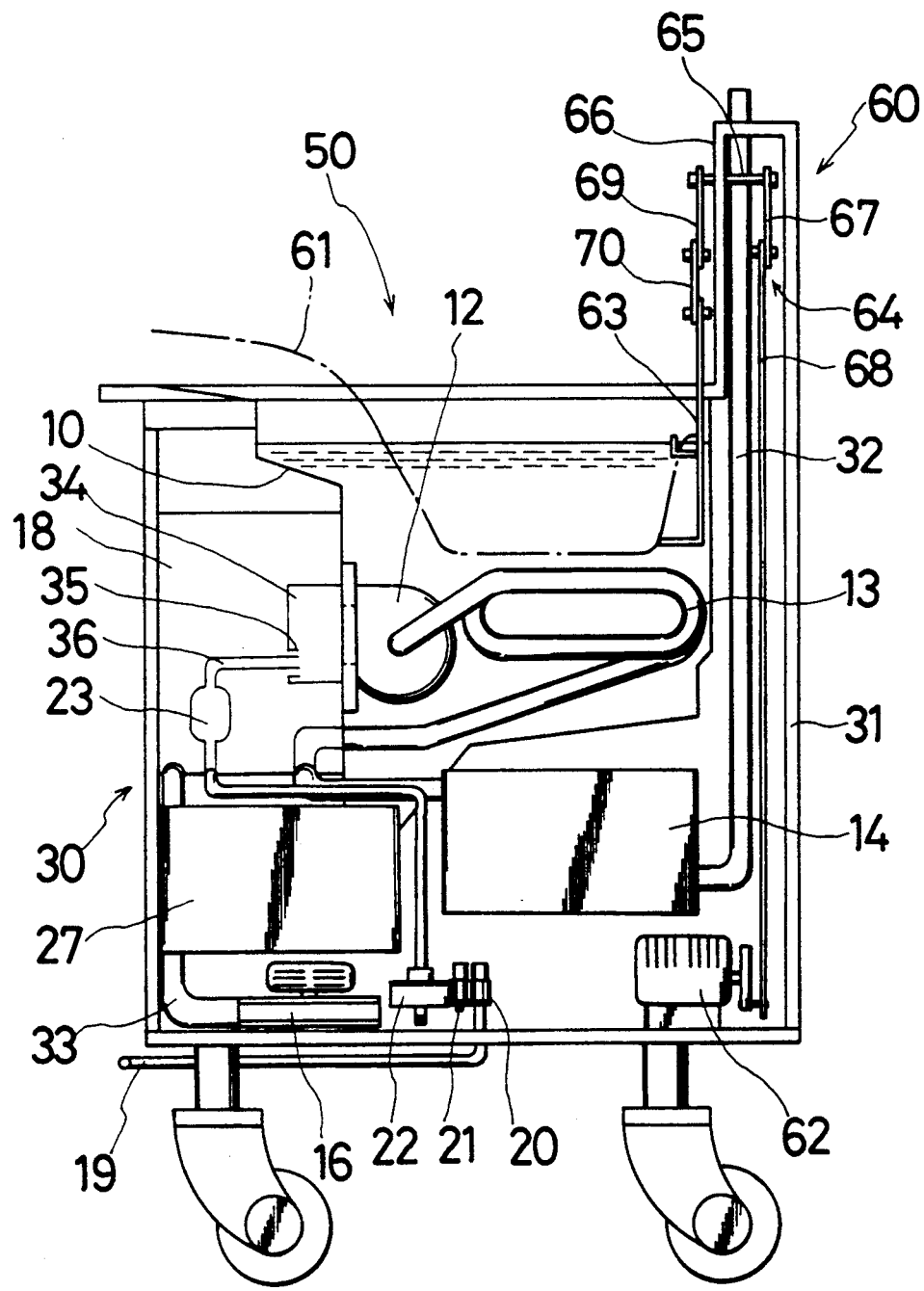
FIG. 3 is a schematic view showing a fryer apparatus in commercial application as a second embodiment of the invention.

Another fryer apparatus 50 of a second embodiment is briefly described according to FIG. 3. The fryer apparatus 50 has the same check valve-free pulse combustor 30 as the fryer apparatus 1 of the first embodiment, and further includes a lift system 60 instead of the filtering system 40 of the first embodiment. The lift system 60 holding a food basket 61 soaks food items supported on the basket 61 into cooking oil in the frypot 10 and lifts the basket 61 up automatically when a timer (not shown) shows elapse of a predetermined cooking or frying time. The basket 61 may manually be lifted up through operation of control pads or buttons.

The lift system 60 includes: a motor 62 disposed under the exhaust decoupler 14; a holder element 63 for holding the food basket 61; and a link mechanism 64 for vertically moving the holder element 63 corresponding to rotation of the motor 62. The link mechanism 64 rotates a shaft 65 supporting the holder element clockwise or counterclockwise by a predetermined angle 63 through link levers 67, 68. The rotation of the shaft 65 is transmitted through link levers 69, 70 to lift up or down the holder element 63 by predetermined strokes.

The basket 61 with food items is attached to the holder element 63 in the lift-up position and is lowered through rotation of the motor 62 driven by operation of control switches (not shown). When the timer shows elapse of a predetermined time, the motor 62 is again driven to lift the basket 61 up. The lift system 60 allows optimum cooking of food items without any skilled cook.

As described above, the fryer apparatus 50 of the second embodiment includes the check valve-free pulse combustor 30 as a heat source, which sufficiently reduces undesirable noise without any inlet or exhaust muffler. This valve-free structure allows the lift system 60 to be installed in the fryer apparatus 50 without making the fryer apparatus unfavorably bulky, thus desirably saving both the space and labor in commercial cooking facilities.

Although the pulse combustor 30 of the embodiment does not include either an air flapper valve or a gas flapper valve, the fuel gas supply system may include a gas flapper valve.

Since the invention may be embodied in other forms without departing from the scope or spirit of essential characteristics thereof, it is clearly understood that the above embodiment is only illustrative and not restrictive in any sense. The spirit and scope of the present invention is limited only by the terms of the appended claims.

What is claimed is:

1. A fryer apparatus in commercial application wherein cooking oil in a frypot is heated by means of a pulse combustor comprising: a combustion chamber for receiving a mixture of air and fuel gas for pulsative combustion of the mixture; a mixing chamber being coupled with and connected to said combustion chamber for mixing air and fuel gas and supplying the air/fuel mixture to said combustion chamber; an air supply system for supplying the air to said mixing chamber; and a fuel gas supply system for supplying fuel gas to said mixing chamber;

the improvement being characterized by:
the air supply system of said pulse combustor being free of a check valve for preventing back flow of combustion exhaust into said air supply system.

2. A fryer apparatus in accordance with claim 1, wherein the air supply system of said pulse combustor has an ever-on fan for continuously feeding the air to said mixing chamber, diluting combustion exhaust back flown to said mixing chamber with air/fuel mixture, and supplying the exhaust-containing air/fuel mixture to said combustion chamber.

3. A fryer apparatus in accordance with claim 2, wherein the fuel gas supply system of said pulse combustor is also free of a check valve for preventing back flow of combustion exhaust into said fuel gas supply system.

4. A fryer apparatus in accordance with claim 2, further comprising a filtering system for cleansing used cooking oil by filtering particulate food items from the cooking oil drained from said frypot.

5. A fryer apparatus in accordance with claim 2, further comprising a lift system for elevating and soaking food items from and into said frypot.

6. A fryer apparatus in commercial application wherein cooking oil in a frypot is heated by means of a pulse combustor,
said pulse combustor comprising:
a combustion chamber for receiving a mixture of air and fuel gas for pulsative combustion;
at least one tail pipe coupled to said combustion chamber for discharging combustion exhaust from said combustion chamber;
an exhaust decoupler coupled with said tail pipe;
a mixing chamber being coupled with and connected to said combustion chamber via a first opening having a flame trap, for mixing the air and fuel gas and supplying an air/fuel mixture to said combustion chamber;
an air chamber being coupled with and connected to said mixing chamber via a second opening formed on a face opposite to said first opening, for supplying the air to said mixing chamber;
a gas supply conduit for supplying the fuel gas to said mixing chamber, said gas supply conduit going through said air chamber and having one end projecting to connect with said mixing chamber via said second opening; and
an ever-on fan for continuously feeding the air to said mixing chamber, diluting combustion exhaust back flown to said mixing chamber with air/fuel mixture, and supplying the exhaust-containing air/fuel mixture to said combustion chamber.

7. A fryer apparatus in accordance with claim 6, wherein said second opening is positioned eccentric with respect to said first opening.

8. A fryer apparatus in accordance with claim 6, further comprising a filtering system for cleansing used cooking oil by filtering particulate food items from the cooking oil drained from said frypot.

9. A fryer apparatus in accordance with claim 8, wherein said filtering system comprising: an oil reservoir disposed under a draining conduit connected to the bottom of said frypot; a filter element arranged in the lower portion of said oil reservoir; an oil pump for returning cooking oil, cleansed through said filter element, to said frypot; and a piping system constituting a return path of the cleansed cooking oil.

10. A fryer apparatus in accordance with claim 6, further comprising a lift system for elevating and soaking food items from and into said frypot.

11. A fryer apparatus in accordance with claim 10, wherein said lift system comprising: a motor disposed under said exhaust decoupler; a holder element for holding a food basket; and a link mechanism for vertically moving the holder element corresponding to rotation of the motor.

* * * * *